United States Patent

Schanno

Patent Number: 5,270,065
Date of Patent: Dec. 14, 1993

[54] METHOD OF REDUCING SLUMPING IN PIE DOUGH

[75] Inventor: Mark S. Schanno, Eagan, Minn.

[73] Assignee: The Pillsbury Company, Minneapolis, Minn.

[21] Appl. No.: 792,106

[22] Filed: Nov. 14, 1991

[51] Int. Cl.$^5$ .............................................. A21D 8/10
[52] U.S. Cl. ...................... 426/94; 426/289; 426/502; 426/556; 426/622
[58] Field of Search ............... 426/556, 622, 94, 289, 426/502

[56]      References Cited
       U.S. PATENT DOCUMENTS 3,397,064  8/1968  Matz ..................................... 99/90
4,172,154 10/1979  Lipinski .............................. 426/804
4,297,378 10/1981  Haasl, et al. ....................... 426/532
4,407,839 10/1983  Corbeil et al. ..................... 426/622

OTHER PUBLICATIONS

Monroe Boston Strause, Pie Marches On, 1963, Ahrens Book Company, Inc. New York. pp. 12-19.

Primary Examiner—Jeanette Hunter
Assistant Examiner—Mary S. Mims
Attorney, Agent, or Firm—Amy J. Hoffman; William J. Connors

[57]              ABSTRACT

A method of reducing slumping in pie dough crust and the product resulting from that method. The method comprises dusting pie dough with rice flour either before or after sheeting the dough.

18 Claims, 1 Drawing Sheet

METHOD OF REDUCING SLUMPING IN PIE DOUGH

BACKGROUND OF THE INVENTION

Pie crust dough is difficult and time consuming to make at home. The flakiness of the baked crust depends upon many variables such as the temperature of the shortening when added to the dough and the amount of effort which is exerted when mixing the dough. Due to these often unnoticed variables, pie crust is quite unpredictable. For instance the same recipe may yield a flaky, light crust on one occasion and on another occasion the same recipe may yield a heavy, dense crust.

Frozen and refrigerated doughs have become increasingly popular with consumers due to the predictability of commercial pie crusts along with the time which is saved when one does not have to mix and sheet the dough. Unbaked doughs are available in many shapes and forms; some dough is sold preformed into a pie pan while other dough is sold flat. An example of a commercially available flat pie crust dough is Pillsbury's "All Ready Pie Crust" which is disclosed in U.S. Pat. No. 4,297,378. The flat dough is more desirable since it allows consumers to use the dough for wider purposes than just for pies. For instance, consumers are able to shape the flat dough into whatever form they choose to make items such as quiches, hors d'oeuvres, tarts, or make two-crust pies without the hassle of making the dough themselves.

Problems do exist with flat dough and three problems become immediately apparent. First, in order to save on packaging and shipping costs it is of benefit to the manufacturer to fold the flat dough to reduce the size of the packaged dough. However, when the dough is folded back on itself one encounters the problem of the dough adhering to itself and thereby becoming impossible to unfold by the consumer. To eliminate this problem manufacturers have utilized slip sheets between dough surfaces. The dough is easily unfolded and ready for use by the consumer once the slip sheet is peeled from the dough. Employing slip sheets has overcome the problem of the dough adhering to itself but the slip sheets have increased production costs of flat refrigerated doughs.

The second problem encountered with folding dough is that the dough develops cracks along the fold lines which create fissures in the baked product. Consumers find this cracking to be unacceptable. In order to alleviate cracking, the manufacturer can add more shortening or water to the dough which creates a more pliable dough which is less likely to crack upon folding. This seems like an easy enough solution, however, with the addition of an increased amount of shortening or water the third problem of flat dough is created. That is, the dough does not hold its form during baking and retracts down the inclined sides of the pie pan. Although the increased shortening or water content creates a more pliable dough which eliminates cracking, it also creates a more pliable dough which is less likely to hold its shape during baking. Therefore, the manufacturer walks a very thin line between adding enough shortening to eliminate cracking of the folded dough yet not adding too much shortening so that the dough will not maintain its shape during baking.

It is well known in the refrigerated dough industry to use rice flour as a separating agent. For example, see U.S. Pat. No. 3,397,064 which discusses using rice flour to separate pressurized refrigerated biscuit dough. Rice flour is desirable because it does not become gummy when introduced to moisture as does wheat flour. It was surprisingly found while testing rice flour as an alternative separating agent on flat refrigerated dough that application of the rice flour greatly improved baked dough's ability to hold its prebaked shape.

SUMMARY OF THE INVENTION

The misshaping of dough which occurs in pie crusts during baking is referred to as slumping, that is, when the dough retracts down the inclined sides of a pie pan the term used to refer to this action is "slumping." Use of a non-gumming dusting agent such as rice flour reduces the amount of slumping in pie crust dough. Applying the dusting agent of the present invention to dough not only reduces slumping but also allows the manufacturer to add enough shortening or water so as to effectively eliminate cracking in folded doughs without the concern of adding too much shortening which would result in slumping under traditional circumstances.

DETAILED DESCRIPTION OF THE INVENTION

In its broadest aspects the invention is directed to an improvement in dough. It has been found that applying a non-gumming edible substance to dough eliminates problems encountered both in the flat and preformed dough industries. This edible substance is also called a dusting agent, however, the substance may be dusted on the dough before or after sheeting. By non-gumming it is meant that the agent does not lose its physical integrity when exposed to moisture and does not agglomerate. If the dusting is done before sheeting, the dusting agent is actually pressed into the dough surface during sheeting. If the dusting agent is added after the dough is sheeted, the agent remains on the surface of the dough.

Rice flour is preferably used as the dusting agent in the present invention. Rice flour does not gum when exposed to moisture. While not desiring to be bound by theory, it is believed that rice flour helps to reduce slumping because it acts as a migration barrier which does not allow moisture or oil from the dough to contact the smooth surface of the pan.

Pie dough traditionally is composed of flour, shortening, water and salt. Based on weight of the dough, pie dough formulae are in the range of between about 45% and about 58% flour, between about 25% and about 35% shortening, between about 19% and about 24% total water, and between the range of about 0.2% and about 2% salt. As dough heats upon baking, the shortening and water in the dough become fluid. In uncoated doughs this then contacts and lubricates the surface of the pan making it difficult for the dough to adhere to the smooth surface. Therefore, when dough is not dusted with rice flour it easily slides down the inclined pan. However, in dough which is coated with rice flour, the dusting agent creates a barrier through which the fluid shortening and water do not readily migrate. These lubricating agents never come in contact with the pan and the rice flour effectively limits the slumping of dough.

EXAMPLES

The following examples illustrate the practice of the invention in its most preferred form.

Slumping is defined as the amount of retracting that occurs when pie dough is placed on an incline greater than 90 degrees from the horizontal to up to less than 180 degrees from the horizontal such as that of a pie pan. The slumping measurement is measured in millimeters and is that distance from the initial position of the dough on the incline before baking down to the position of the dough after baking. The slumping measurement is essentially that distance which the dough retracts down an incline during baking.

Figure 1:
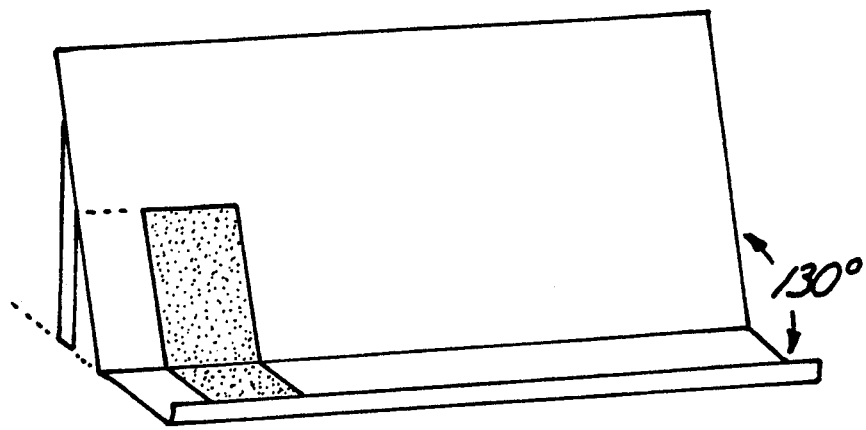
FIG. 1 is an isometric view of a slumpometer with a piece of dough placed on the slumpometer.
Figure 2:
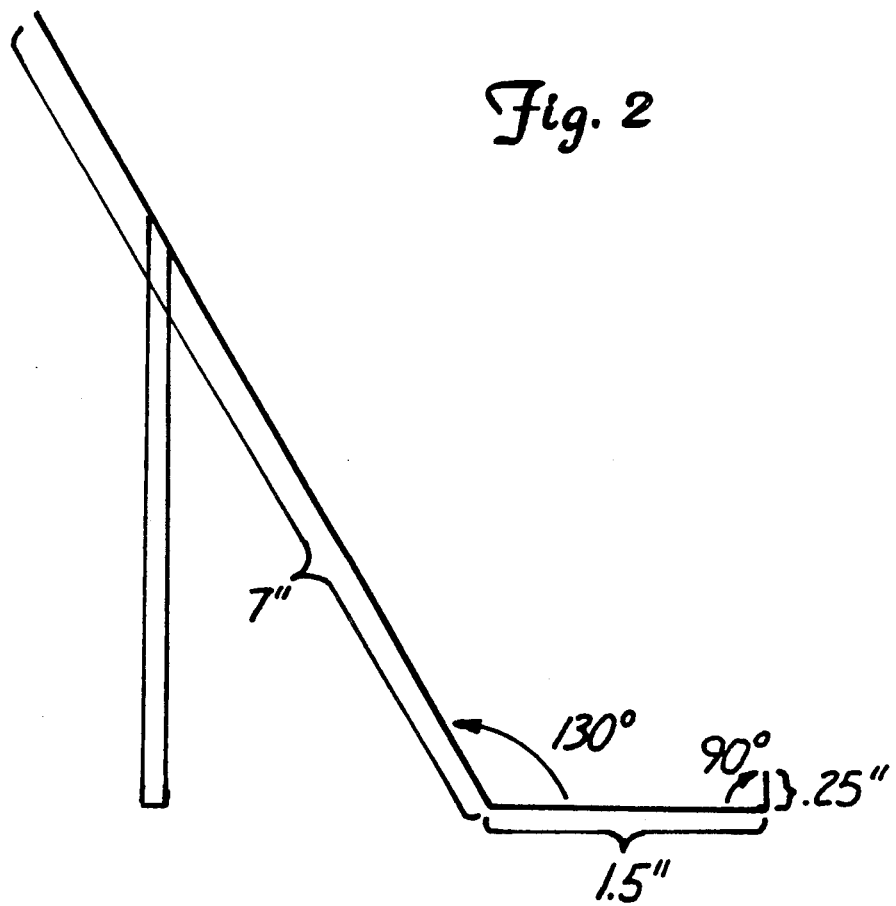
FIG. 2 is a side view of a slumpometer.

A device called a slumpometer was used to measure the amount of slumping in the dough samples as shown in FIGS. 1 and 2. The slumpometer was designed to mimic the angled sides of a pie pan.

The width or foot of the dough strips were placed along the vertical ledge which was attached to the horizontal base of the slumpometer as shown in FIG. 2. This ledge prevented the dough strips from sliding completely down the incline of the slumpometer. The length of the dough strips ran up the 130 degree incline.

For each of the following examples dough was prepared from the following formula ranges according to the process as disclosed in U.S. Pat. No. 4,297,378. Doughs can also be purchased as Pillsbury "All Ready Pie Crusts." Percentages are given by weight of the dough.

| Flour Blend | 38–58%, preferably between about 50–53% |
| --- | --- |
| Shortening | 24–35%, preferably between about 28–32% |
| Total Water | 19–25%, preferably between about 21–23% |
| Salt | 0–3%, preferably between about 1.2–2% |

The shortening had a solid fat index at 50 degrees F. of about 25 to 36, preferably 25.5 to 28, and had a Wiley melting point of at least 108 to 118 degrees F., preferably 108.5 to 112 degrees F. All purpose wheat flour may be used for the flour blend, or high starch flour may be used such that the flour blend includes starch in an amount such that the dough contained between about 37% to about 47% starch, preferably between about 42 to about 47%, and between about 1.5% up to about 6% vital wheat gluten, preferably between 1.5% up to about 3.5%. Water is introduced to the dough by two means, that is (1) by adding it as a separate ingredient, and also (2) by adding flour to the dough, the flour contains a certain amount of water. The total water as listed above takes into account both means of water addition and is the total moisture content of the dough.

The dough was sheeted to a thickness of about 1/16 of an inch up to about 5/32 of an inch, preferably about 3/32 of an inch. Wheat flour was added during sheeting to prevent the dough from adhering to the rollers. Once the dough was sheeted, the dough was brushed to remove substantially all of the wheat flour. Eleven and one-quarter inch diameter circles were stamped out of the sheeted dough and used for the Examples below unless otherwise stated.

River Rice Flour RL-100 from Rivland Foods (Houston, Tex.) was used for the following Examples unless otherwise specified.

EXAMPLE 1

Three samples were tested for slumping which included (1) dough coated with rice flour where the flour was added after sheeting, (2) dough coated with rice flour where the flour was added before sheeting (during sheeting the flour was impregnated into the surface of the dough) and (3) a control which was not coated with rice flour.

For the first sample a #30 mesh strainer was used to apply River Rice Flour RL-100 from Rivland Foods Houston, Tex. to the dough. Enough flour was sifted to lightly coat one side of an 11¼ inch diameter circular dough piece, between about 0.005 grams to about 0.04 grams, preferably about 0.03 grams of rice flour were added per square inch of dough. Six circles of dough were coated in this manner.

For the second sample unsheeted dough was liberally covered with rice flour, sufficient rice flour was added such that between about 0.005 grams rice flour to about 0.04 grams, preferably about 0.03 grams was covering each square inch of the dough after sheeting. The dough was then sheeted which impregnated the rice flour into the surface of the dough sheet. Six circles of 11¼ inches in diameter were then stamped out of the dough.

The third sample was a control. These six 11¼ inch diameter dough circles were not coated with rice flour. Control doughs are available as Pillsbury brand "All Ready Pie Crust."

All the doughs from samples 1, 2, and 3 were then covered on both sides with a 0.5 ml shrink film (Amflex from DuPont, Wilmington, Del.) which is referred to as the slip sheet. The doughs were individually folded in half and then the doughs were folded in half again so that the resulting size of the doughs was one-quarter that of the original dough. The doughs were then refrigerated at 38 to 45 degrees F.

After refrigeration the doughs were unfolded. The slip sheets were then removed from the doughs and four 2×5 inch strips were cut from the interior of each of the rice flour dusted doughs and the control doughs. These strips were placed so that the width of each strip was placed on the vertical edge of the incline described above and the length of each strip ran up the incline. For those doughs coated with rice flour, the coated side was placed in contact with the incline. The initial position of the dough was marked on each incline of a slumpometer and the slumpometers bearing dough strips were baked at 375–475 degrees, preferably 450 degrees for 8–12 minutes, preferably 10 minutes.

After baking, the slumpometer bearing dough strips were removed from the oven and the distance the dough had retracted down the incline from its starting point was measured. This measurement was the slumping measurement and the results were as follows. Sample 1, the dough which had been dusted with rice flour after sheeting had a mean slump measurement of 8.6 mm. Sample 2, the dough which had been dusted with rice flour before sheeting, had a mean slump measurement of 26.1 mm where the control had a mean slump measurement of 44.3 mm.

As can be seen, the dough which had been dusted after sheeting (Sample 1) experienced 4 to 5 times less slumping than the Control dough (Sample 3). Although the dough which had been dusted after sheeting (Sample 1) performed better than the dough which had been dusted before sheeting (Sample 2), the latter also experienced reduced slumping.

EXAMPLE 2

In order to determine the effect of rice flour granulation size on slumping, three different granulations of rice flour were dusted on the control dough and the baking experiments described above were conducted. We found that the difference in slumping between the rice flour as purchased and that which passed through a #400 mesh screen was in the range of a few millimeters, an insignificant number when compared to the slumping value of the undusted control. It was further found that slip sheets could be eliminated by practicing the invention without any detrimental effect, that is, without adherence of the dough to itself or without affecting the reduction of slumping.

We claim:

1. A method of reducing pie dough slump comprising dusting the pie dough with a quantity of rice flour sufficient to substantially prevent slumping when the pie dough is heated.

2. The method of claim 1 wherein the pie dough is dusted with rice flour before sheeting.

3. The pie dough of claim 1 wherein the dough is dusted with rice flour after sheeting.

4. The pie dough of claim 1 wherein between about 0.005 grams and about 0.04 grams rice flour is applied per square inch of sheeted dough.

5. The method of claim 1 wherein the composition of the dough comprises:
  a) a flour blend present in the dough in an amount in the range of between about 38% and about 58% by weight;
  b) shortening present in the dough in an amount in the range of between about 24% and about 35% by weight of dough;
  c) water in an amount in the range of between about 19% and about 25% by weight of dough.

6. The method of claim 3 wherein the composition of the dough comprises:
  a) the flour blend is present in the range of between about 50% and about 53% by weight of dough;
  b) shortening is present in the range of between about 28% and about 32% by weight of dough; and
  c) water is present in the range of between about 21% and about 23%.

7. The method of claim 1 wherein the composition of the dough comprises:
  a) a flour blend present in the dough in an amount in the range of between about 38% and about 58% by weight, said proportion of flour blend being calculated on the basis of dry flour blend in the dough, said flour blend including starch in an amount such that the dough contains starch in the range of between about 37% and 47% by weight of dough based on weight of dry starch;
  b) shortening having a solid fat index value at 50 degrees F. in the range of between about 25 and about 36 and a Wiley Melting Point in the range of between about 108 degrees F. and about 118 degrees F., said shortening being present in the dough in an amount in the range of between about 24% and about 35% by weight of dough;
  c) water in an amount in the range of between about 19% and about 25% by weight of dough.

8. A pie dough which exhibits reduced slumping, comprising:
  a) a flour blend present in the dough in an amount in the range of between about 38% and about 58% by weight of dough;
  b) shortening present in the dough in an amount in the range of between about 24% and about 35% by weight of dough;
  c) water in an amount in the range of between about 19% and about 25% by weight of dough; and
  d) rice flour dusted on said dough in a quantity sufficient to substantially present slumping when the pie dough is heated.

9. The pie dough of claim 8 wherein:
  a) the flour blend is present in the range of between about 50% and about 53% by weight of dough;
  b) the shortening is present in the range of between about 28% and about 32% by weight of dough; and
  c) water is present in the range of between about 21% and about 23%.

10. The pie dough of claim 8 wherein
  a) the flour blend is present in the dough in an amount in the range of between about 38% and about 58% by weight, said proportion of flour blend being calculated on the basis of dry flour blend in the dough, said flour blend including starch in an amount such that the dough contains starch in the range of between about 37% and 47% by weight of dough based on weight of dry starch;
  b) the shortening has a solid fat index value at 50 degrees F. in the range of between about 25 and about 36 and a Wiley Melting Point in the range of between about 108 degrees F. and about 118 degrees F., said shortening being present in the dough in an amount in the range of between about 24% and about 35% by weight of dough;
  c) the water in an amount in the range of between about 19% about 25% by weight of dough; and
  d) rice flour dusted on said dough.

11. The pie dough of claim 8 wherein the dough is dusted with rice flour after sheeting.

12. The pie dough of claim 8 wherein the dough is dusted with rice flour before sheeting the dough.

13. The pie dough of claim 8 wherein between about 0.005 grams and about 0.04 grams rice flour is applied per square inch of sheeted dough.

14. A method of reducing pie dough slump, comprising the steps of:
  a) mixing together flour, shortening and water to form a pie dough;
  b) sheeting the pie dough to define an upper and lower surface; and
  c) dusting the upper and lower surfaces of the pie dough with rice flour in a quantity sufficient to substantially prevent slumping when the pie dough is heated.

15. The method of reducing pie dough slump of claim 14, wherein the shortening and water is present in sufficient quantities so that if the dough is folded, it will not developing significant cracks.

16. The method of reducing pie dough slump of claim 15, wherein the flour is present in the dough in an amount in the range of between about 38% and about 58% by weight of dough; in shortening is present in the dough in an amount in the range of between about 24% and about 35% by weight of dough and the water is present in the dough in an amount in the range of between about 19% and about 25% by weight of dough.

17. The method of reducing pie dough slump of claim 16, wherein between about 0.005 grams and about 0.04 grams of rice flour is applied per square inch of surface area of the dough.

18. A pie dough which exhibits reduced slumping comprising:

a) a flour blend present in the dough in an amount in the range of between about 50% and about 58% by weight of dough;

b) shortening present in the dough in an amount in the range of between about 28% and about 32% by weight of dough;

c) water in an amount in the range of between about 21% to about 23% by weight of dough, the shortening and water being present in a sufficient amount whereby the dough will not develop cracks when folded; and d) between about 0.005 grams and about 0.04 grams of rice flour applied per square inch of dough.

* * * * *